United States Patent
Kang et al.

(10) Patent No.: US 11,513,977 B2
(45) Date of Patent: Nov. 29, 2022

(54) PIPELINED DATA PROCESSING IN FABRIC-ENABLED COMPUTATIONAL STORAGE

(71) Applicant: Samsung Electronics Co., Ltd., Suwon-si (KR)

(72) Inventors: Yangwook Kang, San Jose, CA (US); Woongjin Chun, Santa Clara, CA (US); Yang Seok Ki, Palo Alto, CA (US)

(73) Assignee: SAMSUNG ELECTRONICS CO., LTD.

( * ) Notice: Subject to any disclaimer, the term of this patent is extended or adjusted under 35 U.S.C. 154(b) by 152 days.

(21) Appl. No.: 17/006,767

(22) Filed: Aug. 28, 2020

(65) Prior Publication Data

US 2021/0397567 A1 Dec. 23, 2021

Related U.S. Application Data

(60) Provisional application No. 63/040,509, filed on Jun. 17, 2020.

(51) Int. Cl.
*G06F 13/16* (2006.01)
*G06F 3/06* (2006.01)
*G06F 9/38* (2018.01)

(52) U.S. Cl.
CPC .......... *G06F 13/1668* (2013.01); *G06F 3/061* (2013.01); *G06F 3/0659* (2013.01); *G06F 3/0673* (2013.01); *G06F 9/3867* (2013.01)

(58) Field of Classification Search
None
See application file for complete search history.

(56) References Cited

U.S. PATENT DOCUMENTS

| | | | |
|---|---|---|---|
| 8,140,719 | B2 | 3/2012 | Lauterbach et al. |
| 9,747,039 | B1 | 8/2017 | Coleman et al. |
| 9,785,356 | B2 | 10/2017 | Huang |
| 9,898,427 | B2 | 2/2018 | Bergsten et al. |
| 10,007,561 | B1 | 6/2018 | Pudipeddi et al. |
| 2018/0157445 | A1 | 6/2018 | Gissin et al. |
| 2018/0314450 | A1 | 11/2018 | Qiu et al. |
| 2019/0310958 | A1 | 10/2019 | Pinto et al. |
| 2020/0218684 | A1* | 7/2020 | Sen .......................... H04L 69/16 |
| 2020/0341904 | A1* | 10/2020 | Reddy ..................... G06F 12/10 |

* cited by examiner

*Primary Examiner* — Scott C Sun
(74) *Attorney, Agent, or Firm* — Renaissance IP Law Group LLP

(57) ABSTRACT

A storage device is disclosed. The storage device may include compute engines. The compute engines may include storage for data, a storage processing unit to manage writing data to the storage and reading data from the storage, a data processing unit to perform some functions on the data, and an accelerator to perform other functions on the data. An Ethernet component may receive a request at the storage device from a host over a network. A data processing coordinator may process the request using a compute engine.

20 Claims, 10 Drawing Sheets

PIPELINED DATA PROCESSING IN FABRIC-ENABLED COMPUTATIONAL STORAGE

RELATED APPLICATION DATA

This application claims the benefit of U.S. Provisional Patent Application Ser. No. 63/040,509, filed Jun. 17, 2020, which is incorporated by reference herein for all purposes.

FIELD

Embodiments relate generally to storage devices, and more particularly to a storage device capable of managing its own data flow with modularized resources.

BACKGROUND

Disaggregated storage architectures are widely used today for high performance and capacity, but current remote storage systems, such as JBOF (Just a Bunch of Flash) or JBOD (Just a Bunch of Drives), are not yet ready to meet performance goals due to their architectural limitations. Moreover, the adoption of JBOFs has increased network congestion significantly because the metadata generated by storage controllers need to be transferred over the network may be an order of magnitude larger than the original user data.

A need remains to improve the management of data flow and computational resources within a storage device.

DETAILED DESCRIPTION

Figure 1:
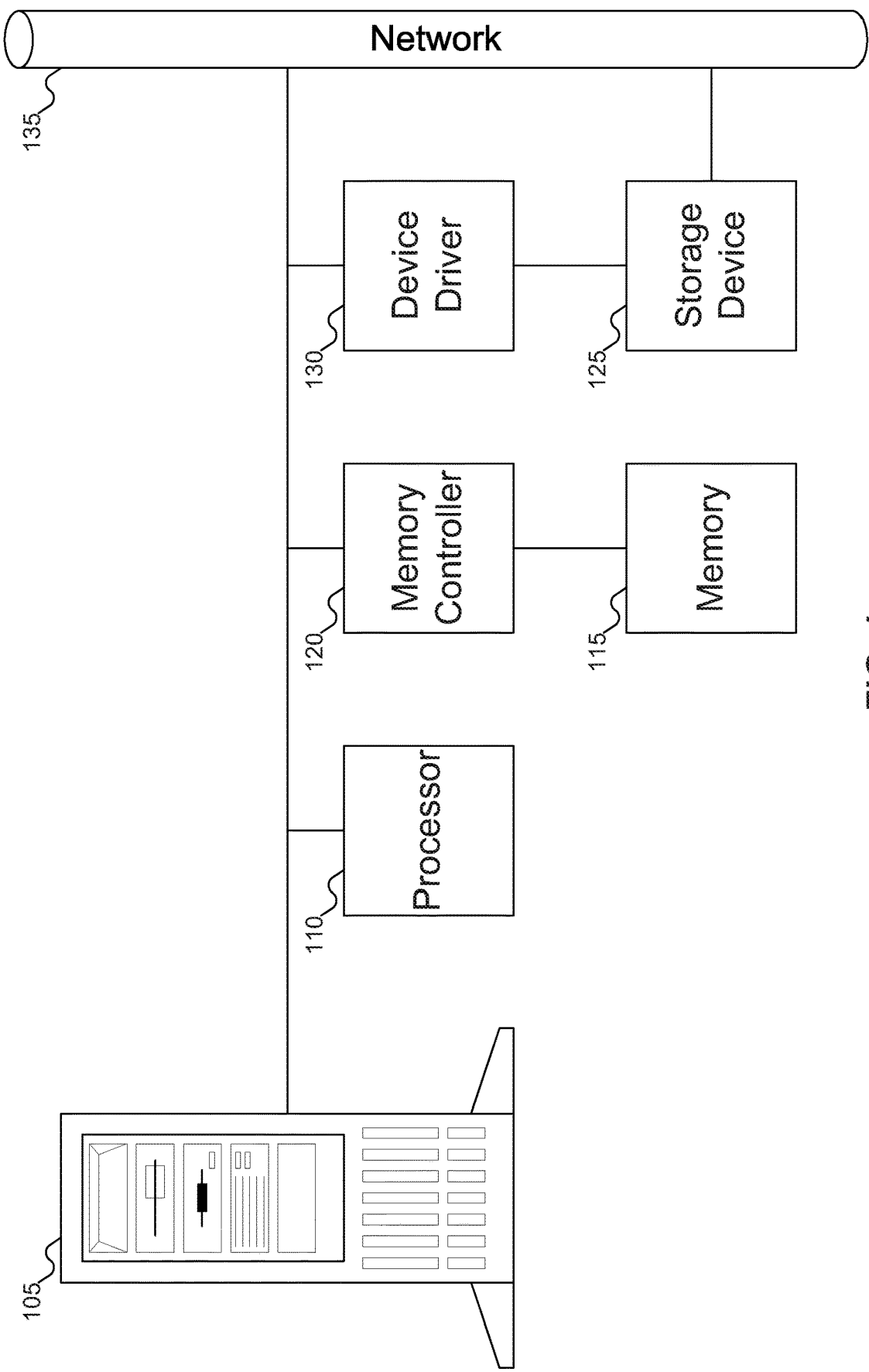
FIG. 1 shows a machine with a storage device capable of supporting control paths, according to embodiments.

Reference will now be made in detail to embodiments, examples of which are illustrated in the accompanying drawings. In the following detailed description, numerous specific details are set forth to enable a thorough understanding. It should be understood, however, that persons having ordinary skill in the art may practice embodiments without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the embodiments.

The terminology used in the description of the embodiments herein is for the purpose of describing particular embodiments only and is not intended to be limiting of the embodiments. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

A new architecture of a Solid State Drive (SSD), called Fabric-enabled Computational Storage (FCS), is presented, which may process data coming over a network and execute an offload task from a host system. The architecture may allow a greater number of high-performance SSDs in a storage server while reducing the amount of data transferred over the network, which is one of the major bottlenecks in a disaggregated storage architecture.

The FCS architecture may include a Storage Processing Unit (SPU), accelerators (hardware features designed for SSD command processing), flash (flash channels and chips), an Ethernet connection, and a Data Processing Unit (DPU).

The SPU and the accelerators may perform functions that operate on data stored in the flash. These functions may include, for example, encryption/decryption, compression/decompression, channel encoding/decoding, vector addition/multiplication, and other functions. In some embodiments, the SPU may perform some basic functions and may operate on a flash channel, whereas the accelerators may be capable of more general purpose computation/processing and may operate on data across multiple flash channels.

The Ethernet component allows a connection to one or more networks, which may be done using Transmission Control Protocol/Internet Protocol (TCP/IP) or other fast interconnect technologies like Remote Direct Memory Access (RDMA), RDMA over Converged Ethernet (RoCE) and InfiniB and, among other possibilities. The DPU may process an offloaded task (such as binary code received from the host system). The DPU may be a general purpose processor such as a central processing unit (CPU) and graphics processing unit (GPU), or the DPU may be a programmable logic such as an Application-Specific Integrated Circuity (ASIC) or a Field Programmable Gate Array (FPGA). In some embodiments, the DPU may operate in conjunction with an operating system (OS) installed to an extra ARM coprocessor or an SPU.

Pipelined Data Processing in FCS

To utilize the new components, the internal data flow between Ethernet, DPU, SPU, and Flash may be managed for each task according to a pipelined computation model.

Under the pipelined computation model, data may be processed using a requested or predefined order of compute and flash resources. By doing so, the pipelined computation model allows users to utilize all the resources in a FCS without exposing internal resources of the FCS to a host, and without running user binary code directly on the storage device. The storage device may expose commands that may be executed using various components within the storage device, which the host system may use to define custom sequences of operations (which may include one or more commands) that may be performed on data. The storage device may also pre-define sequences of operations that may be requested by the host system.

In the pipelined computation model, a Data Path (DP) coordinator may process a data processing request by delivering a command to a compute or flash resource, called a compute engine, following a data processing order for the request. Each compute engine may process a given command (for example, in a first-in-first-out (FIFO) fashion) and return the result back to the DP coordinator. This DP coordinator may be implemented to run in the DPU, the SPU, or an accelerator, and may include hardware. A DP coordinator may include a command receiver, a data flow manager, and a pipeline processor.

Command Receiver

The command receiver may receive a data processing request from the Ethernet component. A data processing request may contain metadata and optionally data. The metadata may contain information for processing data including a request type and its parameters.

This request and/or metadata may be delivered using existing command formats such as Non-Volatile Memory Express (NVMe), NVMe over Fabric (NVMe-oF), microservices, and other object storage service formats. In each protocol, the data and metadata required for data processing may be transferred as a payload and a new vendor-specific command may be defined to identify a pipelined processing command.

Once the command receiver parses the request, the command receiver may deliver the metadata to the data flow manager to find an order of compute engines for the requested process.

Data Flow Manager

The data flow manager may check a request type of the data processing request and may determine if the data processing request is a built-in command whose order is predefined in FCS. In response to a determination that the request type is a built-in type, the data flow manager may retrieve the predefined control path (for example, from local memory within the FCS or from some long-term storage in the FCS) for the command and pass it to pipeline processor. The data flow manager may also create the predefined control path for the data processing request using known rules and may pass it to the pipeline processor. Otherwise, in response to a determination that the request type is a user-defined type, the data flow manager may retrieve a user-defined order and a corresponding set of commands from the metadata to define a control path. For example, "Read-modify-write" command may be described like below. It may be built-in or user-defined.

| Read-Modify-Write Control Path: | | |
|---|---|---|
| Order: | Flash -> | SPU -> | Flash |
| Command: | {read LBA} | {modify offset~length from the LBA} | {write LBA} |

To run this command, the user metadata may include the following information:

Request type: 'read-modify-write',
Parameters: LB A=1, 2, 3, 4, offset=300, length=1500

For a user-defined data processing task, code may be written by a user for the corresponding compute engine, and sent to the engine prior to an execution. Each engine that may take a user-defined command has a command to store a given code.

Pipeline Processor

The pipeline processor may process data following a given control path. After receiving a control path and user parameters, the pipeline processor may construct a command and may send it to a compute engine. This process may repeat until the control path is empty, after which the pipeline processor may send a response back to the user.

Data Processing Flow Chart

The command receiver first may receive a request and parse metadata, such as request type and parameters. The data flow manager may determine whether the request is user-defined or built-in. The command receiver may create a control path based on user input in response to a determination that the request is built-in. In response to a determination that the request is predefined (that is, built-in), the data flow manager may look up and fetch the control path (for example, from local memory or long-term storage in the FCS). The data flow manager may also create a control path for a request based on known rules. Finally, the pipeline processor may execute the request until the queue of operations is exhausted. Overall, the control path may be executed in a FIFO fashion, although embodiments may support non-FIFO execution (in whole or in part).

Compute Engine

The compute engine may receive a command from a command queue and may execute it using internal compute resources of the compute engine. The compute engine may include DPUs, SPUs, accelerators, and flash. The internal compute resources may also include any combination of CPUs, GPUs, FPGAs, and ASICs. The compute engine may be implemented using an FPGA, a GPU, or an ARM co-processor, among other possibilities.

FIG. 1 shows a machine with a storage device capable of supporting control paths, according to embodiments. In FIG. 1, machine 105, which may also be termed a host, is shown. Machine 105 may include processor 110. Processor 110 may be any variety of processor. (Processor 110, along with the other components discussed below, are shown outside machine 105 for ease of illustration: embodiments may include these components within machine 105.) While FIG. 1 shows a single processor 110 in machine 105, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Machine 105 may also include memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types. Machine 105 may also include memory controller 120, which may be used by machine 105 to manage access to memory 115.

Machine 105 may also include a storage device, such as storage device 125. Storage device 125 may be used to store data. Processor 110 may run device driver 130, which may support access to storage device 125. Storage device 125 may include any desired storage device, which may operate using any desired storage principle. Thus, the storage device may be an SSD, a hard disk drive, or any other desired storage device, and may store data using block-based storage or key-value based storage. While FIG. 1 shows one storage device 125, embodiments may include any number of local storage devices (as well as remote storage devices accessed across network 135, as discussed below).

In various embodiments, storage device 125 may have a dedicated connection to network 135, may share a connection of machine 105 to network 135, or a combination thereof. For example, storage device 125 may include an Ethernet network interface connector (NIC) connected to network 135, may be configured to utilize an Ethernet NIC of machine 105 that is external to storage device 125, or a combination thereof. While Ethernet NICs are described, other types of network connectors may be included in machine 105 and/or storage device 125.

By having a direct connection to network 135, storage device 125 may receive requests from one or more other machines over network 135. In other embodiments, machine 105 may be connected to network 135, but storage device 125 may not be directly connected to network 135. In such embodiments, storage device 125 may still receive commands from remote machines along other paths. For example, the remote machine(s) may send the request to host 105, which may in turn deliver the request to storage device 125. Or the remote machine(s) may send the request to a switch in machine 105, which may in turn deliver the request to storage device 125. Machine 105 may also use network 135 to communicate with remote storage devices in the same way that other remote machines may communicate with storage device 125 across network 135. Thus, machine 105 may communicate with any number of storage devices, and these storage devices may be all local to machine 105, all remote from machine 105, or any desired mix of local and remote storage device.

Network 135 may be any variety of network, including a local area network (LAN), a wide area network (WAN), a metropolitan area network (MAN), or a global network such as the Internet, and may include any combination of these network varieties. Network 135 may include wired connections, wireless connections, or both.

Storage device 125 may communicate using any desired bus and/or protocol for sending and receiving requests and/or data. For example, storage device 125 may connect to network 135 using conventional Ethernet connections, such as a Category 5, Category 5E, or Category 6 cable with an RJ-45 connector, and communicate using the Transmission Control Protocol/Internet Protocol (TCP/IP). In addition or in the alternative, storage device 125 may connect to other components within machine 105 using a Serial AT Attachment (SATA) connector, a Small Computer System Interface (SCSI) connector, a U.2 connector, or an M.2 connector, and communicate using the Peripheral Component Interconnect Express (PCIe) standard. In addition, information may be transmitted using a combination of protocols. For example, storage device 125 may send and receive information using command formats such as Non-Volatile Memory Express (NVMe), Non-Volatile Memory Express over Fabric (NVMe-oF), microservices, among others.

Although FIG. 1 depicts machine 105 as a server (which could be either a standalone or a rack server), embodiments may include machine 105 of any desired type without limitation. For example, machine 105 could be replaced with a desktop or a laptop computer or any other machine that may benefit from embodiments. Machine 105 may also include specialized portable computing machines, tablet computers, smartphones, and other computing machines.

Figure 2:
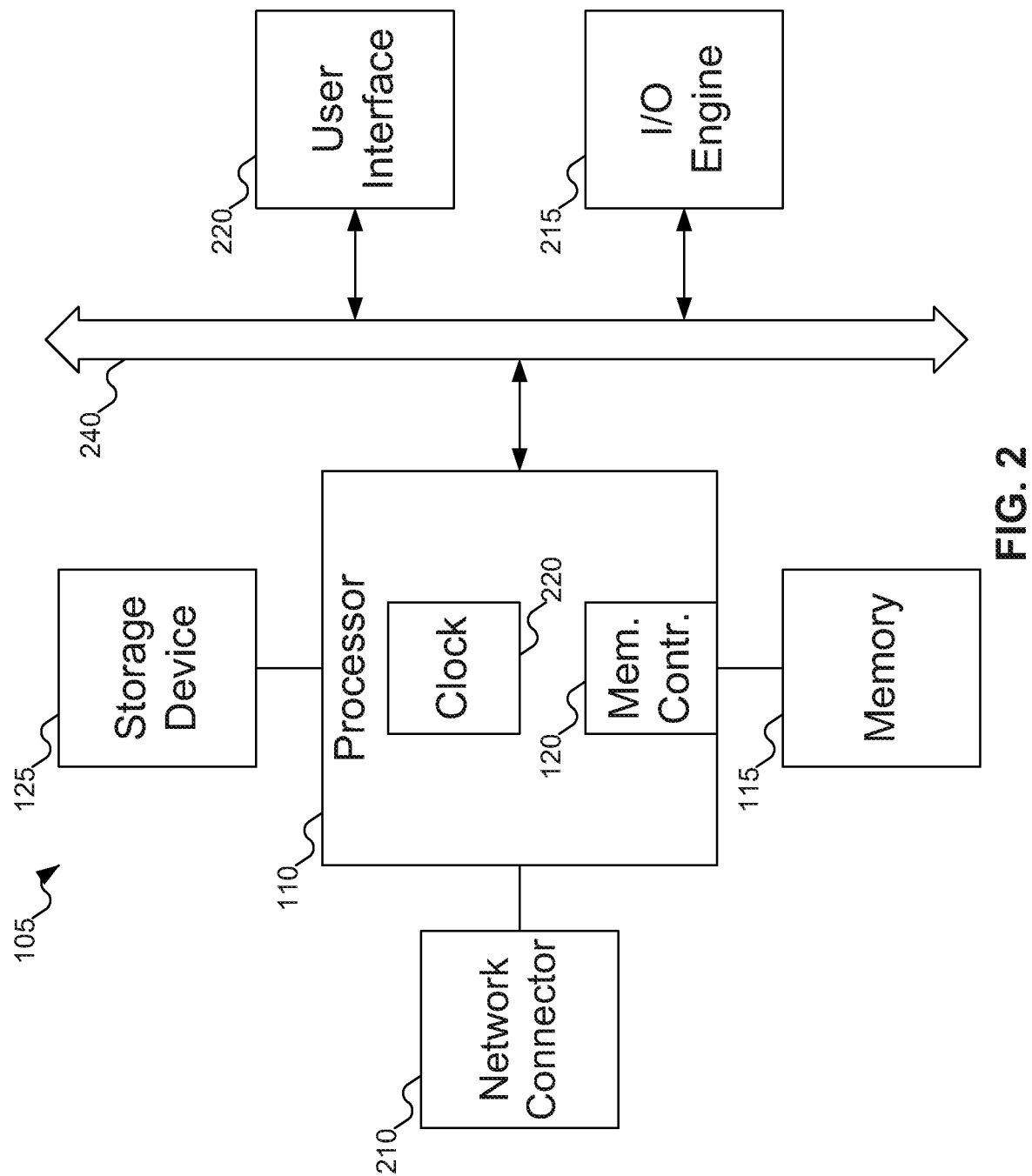
FIG. 2 shows additional details of the machine of FIG. 1.

FIG. 2 shows additional details of machine 105 of FIG. 1. In FIG. 2, typically, machine 105 includes one or more processors 110, which may include memory controllers 120 and clocks 205, which may be used to coordinate the operations of the components of device 105. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output interface ports that may be managed using Input/Output engines 215, among other components.

At its most basic, storage device 125 of FIG. 1 may write data to a storage medium as instructed by host 105 of FIG. 1, and may read data from the storage medium, again as instructed by host 105 of FIG. 1. But modern storage devices are capable of doing much more than merely reading and writing data. For example, modern storage devices may include Data Processing Units (DPUs) and/or accelerators that may perform functions on data, sparing host 105 of FIG. 1 the burden of performing those functions themselves.

But as the number of functions offered by storage device 125 of FIG. 1 increases, being able to effectively utilize those functions may become more complicated. For a host to be able to request that these functions be executed, host 105 of FIG. 1 may need to know what functions are offered by storage device 125 of FIG. 1.

There are various approaches that may be used to instruct storage device 125 of FIG. 1 to execute functions on behalf of host 105 (or a remote machine sending requests via network 135). One approach involves offloading binary code from host 105 of FIG. 1 to a storage Processing Unit (SPU) of storage device 125 of FIG. 1. But offloading binary code to an SPU of storage device 125 of FIG. 1 has some complications. First, it may be difficult to write efficient binary code, particularly if the internal hardware architecture of storage device 125 of FIG. 1 are not known to the user writing the binary code. Second, since an SPU of storage device 125 of FIG. 1 has access to all data stored on storage device 125 of FIG. 1, it is possible for binary code written by one user to access data belonging to another user, which may be contrary to security considerations.

A second approach is to have host 105 of FIG. 1 coordinate the operations of storage device 125 of FIG. 1. Using this approach, host 105 of FIG. 1 may send a request that a particular command be performed by storage device 125 of FIG. 1, then receive a result, after which host 105 of FIG. 1 may send another command to be performed by storage device 125 of FIG. 1, and so on. The DPU of storage device 125 of FIG. 1 may be exposed to host 105 of FIG. 1 directly, permitting host 105 of FIG. 1 to run code using these hardware resources. But because host 105 of FIG. 1 manages every operation of storage device 125 of FIG. 1, there may be significant latency in host 105 of FIG. 1 sending commands to storage device 125 of FIG. 1 (particularly if host 105 of FIG. 1 is communicating with storage device 125 of FIG. 1 over network 135 of FIG. 1.) Further, if only the DPU of storage device 125 of FIG. 1 may be used for data processing, host 105 of FIG. 1 may perform some processing that could be performed by storage device 125 of FIG. 1, resulting in an inefficient use of resources of storage device 125 of FIG. 1. Finally, if host 105 of FIG. 1 is managing multiple storage devices, having host 105 of FIG. 1 coordinate the operations of storage device 125 of FIG. 1 may not scale up well. The communication latency may also be increased if host 105 of FIG. 1 manages storage devices across network 135 of FIG. 1, further affecting the ability to scale this approach.

A third approach is to define control paths that specify how particular requests are to be satisfied by storage device 125 of FIG. 1. These control paths may specify which modules of storage device 125 of FIG. 1 may perform particular functions on data, and may specify the order of such operations. These control paths may be predefined in storage device 125 of FIG. 1, or may be defined by host 105 of FIG. 1. By using such control paths, even host-defined control paths, the functionalities offered by storage device 125 of FIG. 1 may be used efficiently, without risking any security considerations or requiring an understanding of the internal hardware architecture.

Figure 3:
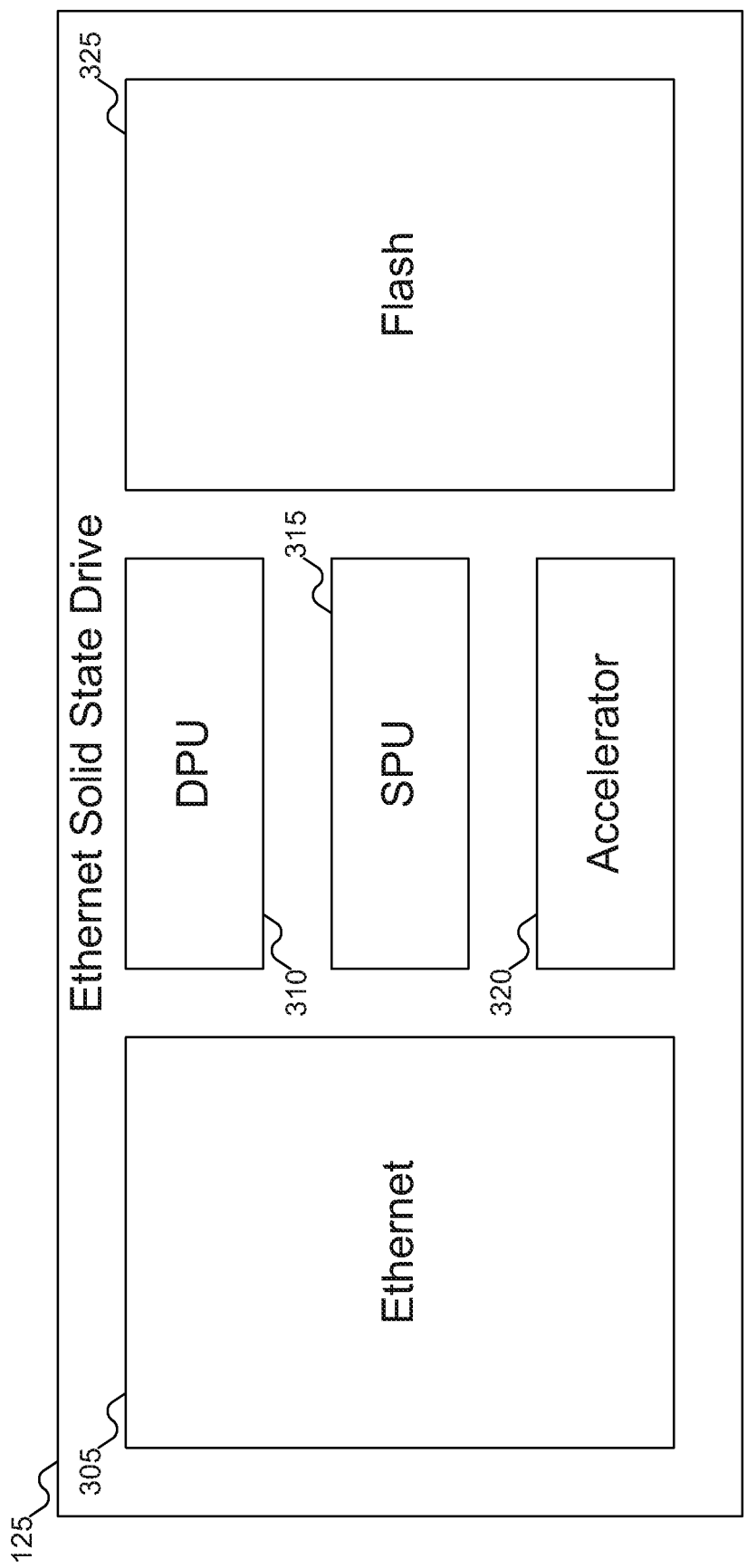
FIG. 3 shows a general architecture of an Ethernet Solid State Drive (SSD) that may be used as the storage device of FIG. 1.

FIG. 3 shows a general architecture of an Ethernet Solid State Drive (SSD) that may be used as storage device 125 of FIG. 1. As discussed above, storage device 125 of FIG. 1 may be any type of storage device, including, as an example, a SSD. An Ethernet SSD, as shown in FIG. 3, is a form of SSD that includes Ethernet component 305, permitting the SSD to communicate directly with the network for remote connections, rather than having such remote connections travel through internal components of machine 105 of FIG. 1 (for example, processor 110 of FIG. 1 or a switch). But as discussed above, other embodiments may replace or remove Ethernet component 305 with other components that may support communication with remote hosts. The remainder of this discussion will focus on the use of Ethernet component 305 for communication with network 135 of FIG. 1, with the understanding that appropriate modification may be made to use other techniques for communication between storage device 125 and network 135 of FIG. 1. Further, in the remainder of this discussion, any reference to "host" is intended to refer to a host sending a request to storage device 125, whether the host is host 105 of FIG. 1 or a remote host communicating over network 135 of FIG. 1.

Aside from Ethernet component 305, Ethernet SSD (which may also be abbreviated eSSD) may include DPU 310, SPU 315, accelerator 320, and flash 325. DPU 310, of which there may be more than one, may be a data processing unit. DPU 310 may handle operations on data that have been loaded into local memory (or other storage) within DPU 310. In some embodiments, DPU 310 does not have direct access to data stored in flash 325: thus, DPU 310 may only operate on data provided to DPU 310 from some other source (such as another component of Ethernet SSD 125 or host 105 of FIG. 1).

DPU 310 may be implemented using any desired hardware. For example, DPU 310 may be implemented using a general purpose or custom Central Processing Unit (CPU), a Graphics Processing Unit (GPU), a General-Purpose Graphics Processing Unit (GPGPU), a Field Programmable Gate Array (FPGA), or an Application-Specific Integrated Circuit, among other possibilities. DPU 310 may also include any desired combination of these elements: for example, an ASIC to implement specific predefined functions and a general purpose CPU to execute software implementing new functions defined by the host.

DPU 310 may also support binary code that may be loaded from host 105 of FIG. 1: this binary code may implement functions not offered by DPU 310 or the other components of Ethernet SSD 125. The term "binary code" is intended to encompass both software that may be executed on a processor of some sort and a new configuration for a configurable logic, such as an FPGA: the exact form the binary code takes may depend on how DPU 310 is implemented. Supporting the execution of binary code on DPU 310 may include an operating system installed on a coprocessor of DPU 310.

Binary code may be loaded into DPU 310 in a number of different ways. Host 105 of FIG. 1 may store the binary code on storage device 125. Then, when the binary code is to be loaded, host 105 of FIG. 1 may provide information to storage device 125 identifying where the binary code is located. For example, if storage device 125 is a block-based storage device, host 105 of FIG. 1 may provide the logical block address (LBA) of the binary code, which storage device 125 may then use to locate the physical block address (PBA) where the binary code is actually stored. Storage device 125 may then load the binary code from the storage. Alternatively, if storage device 125 is a key-value storage device, host 105 of FIG. 1 may provide the key used to store the binary code to storage device 125. Storage device 125 may then use the key to locate the binary code (which would be the "value" paired with that key) in the storage. Alternatively, host 105 may provide the binary code in a special message sent to storage device 125 (for example, using a vendor-specific command).

SPU 315, of which there may be more than one, may handle storage operations (such as reading from flash 325 and writing to flash 325). These operations may involve data, metadata, or other content that may be stored on Ethernet SSD 125.

SPU 315 may be implemented using any desired hardware. For example, SPU 315 may be implemented using a general purpose or custom Central Processing Unit (CPU), a Graphics Processing Unit (GPU), a General-Purpose Graphics Processing Unit (GPGPU), a Field Programmable Gate Array (FPGA), or an Application-Specific Integrated Circuit, among other possibilities. SPU 315 may also include any desired combination of these elements: for example, an ASIC to implement specific predefined functions and a general purpose CPU to execute software implementing new functions defined by the host.

SPU 315 may also support binary code that may be loaded from host 105 of FIG. 1: this binary code may implement functions not offered by SPU 315 or the other components of Ethernet SSD 125. The term "binary code" is intended to encompass both software that may be executed on a processor of some sort and a new configuration for a configurable logic, such as an FPGA: the exact form the binary code takes may depend on how SPU 315 is implemented. Supporting the execution of binary code on SPU 315 may include an operating system installed on a coprocessor of SPU 315. Because SPU 315 may have access to data stored on flash 325, permitting SPU 315 to execute a host's binary code may entail risks: the binary code may permit one user to access another user's data, which is generally not desirable. But while there may be more inherent risk in running binary code on SPU 315 than in DPU 310, embodiments may support one or both options.

Binary code may be loaded into SPU 315 similarly to how binary code may be loaded into DPU 310, as discussed above.

Accelerator 320, of which there may be more than one, may implement specific functions on data that are more optimally performed local to the data. For example, host 105 of FIG. 1 might be interested in knowing how many entries in a database meet specific criteria, but have no interest in those particular entries. Without accelerator 320, the approach is to transfer the database from Ethernet SSD 125 into memory 115 of FIG. 1, after which host 105 of FIG. 1 may perform the query, then erase the database from memory 115 of FIG. 1. If the database contains millions of records, a significant amount of time may be spent transferring the data from Ethernet SSD 125 to memory 115 of FIG. 1, to be erased almost immediately thereafter. In addition to the time required to transfer the database from Ethernet SSD 125 to memory 115 of FIG. 1, this transfer may tie up resources (Ethernet SSD 125 may not be able to process other requests until the transfer is complete; memory 115 of FIG. 1 used to store the database may not be used for other purposes; processor 110 of FIG. 1 may wait until the database is transferred to memory 115 of FIG. 1 before the query may be completed). Thus, this approach is inefficient.

Instead of using this inefficient approach, accelerator 320 may be used. Accelerator 320 may be designed to perform the query of the database and return the result of the query to host 105 of FIG. 1, without the entirety of the database needing to be transferred from Ethernet SSD 125 to memory 115 of FIG. 1 just to perform the query. By performing the query closer to where the data is stored, the time required and the resources used to complete the request may be reduced. The implementation and use of accelerator 320 is discussed further in other applications, such as U.S. patent application Ser. No. 16/124,179, filed Sep. 6, 2018, Ser. No. 16/124,182, filed Sep. 6, 2018, Ser. No. 16/124,183, filed Sep. 6, 2018, and Ser. No. 16/752,612, filed Jan. 17, 2020, all of which are continuations of U.S. patent application Ser. No. 16/122,865, filed Sep. 5, 2018, which claims the benefit of U.S. Provisional Patent Application Ser. No. 62/638,904, filed Mar. 5, 2018, 62/641,267, filed Mar. 9, 2018, and 62/642,568, filed Mar. 13, 2018: all of these applications are incorporated by reference herein.

Flash 325 may act as the underlying storage medium for the data. By using the term "flash", the implication is that the underlying storage medium is a flash medium, such as NAND flash or other non-volatile storage media. But embodiments may use other storage modalities—for example, a hard disk drive—which may use a form of storage other than flash media. The term "flash" may be understood to represent the appropriate storage medium for the type of storage device being used: the use of "flash" in FIG. 3 should not be interpreted as requiring flash memory to store the underlying data.

Collectively, DPU 310, SPU 315, accelerator 320, and flash 325 may be termed compute engines. The term "compute engine" is intended to refer to a module of Ethernet SSD 125 that may perform some operation on data within Ethernet SSD 125. In this manner, the various resources of Ethernet SSD 125 may be modularized, making them "interchangeable" (to some extent: obviously, flash 320 or some form of storage is needed) and replaceable. Further, as the compute engines may be viewed as black boxes in managing data flow within Ethernet SSD 125, additional compute engines may be added to Ethernet SSD 125 without affecting the overall handling of data flow (aside from the possibility of using the new compute engines). The "black box" nature of the compute engines is discussed further with reference to FIG. 8 below.

Note that what a compute engine does with the data depends on the compute engine. DPU 310 and accelerator 320 may manipulate the data using various functions to produce derived data, whereas SPU 315 may simply write data to flash 325 or read data from flash 325, and flash 325 may simply store the data. But embodiments may use compute engines in other ways as well. For example, SPU 315 may perform preprocessing and/or postprocessing of data for DPU 310 and/or accelerator 320, perform independent tasks such as for load balancing purposes, execute special instructions (such as binary code) provided to SPU 315, and the like.

Although the term "binary code" is used above with reference to execution on DPU 310 and/or SPU 315, binary code may also include a new configuration for an FPGA or some equivalent programmable circuit. In addition, while "binary code" suggests that the code is implemented in binary, binary code may also include code written in a low-level programming language (such as assembly language) or a higher-level programming language (whether one implemented generically for many or all processors or specific to the processor within storage device 125). Thus, binary code should be understood as encompassing actual binary code that may be executed by some operating system, code in a low-level programming language, code in a higher level programming language, or a configuration for a circuit such as an FPGA.

Not shown in FIG. 3 are various supporting elements. For example, DPU 310 may include local storage, such as RAM or some other memory variant, to perform functions on data. These supporting elements may be understood to be part of Ethernet SSD 125.

Figure 4:
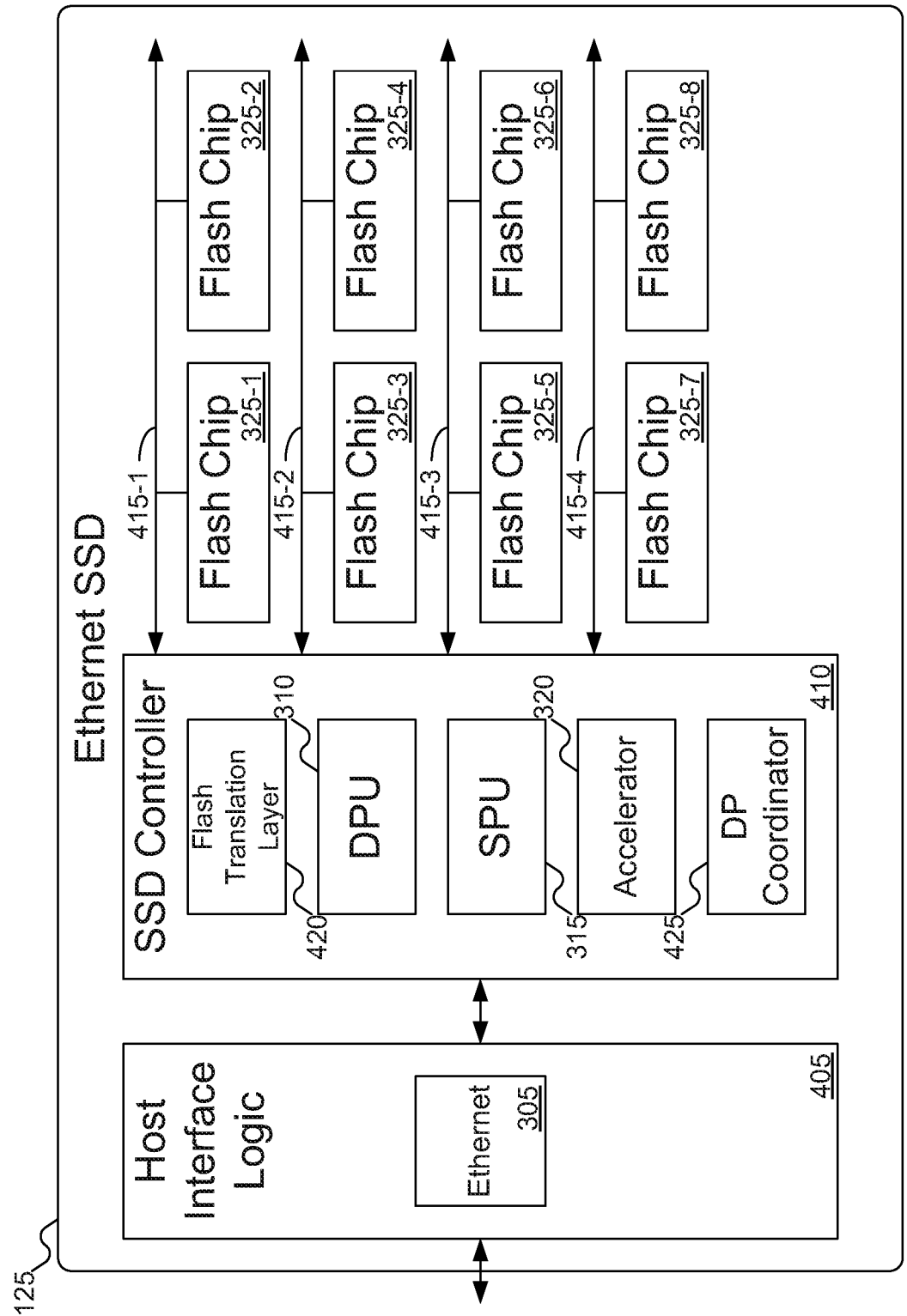
FIG. 4 shows another view of the storage device of FIG. 1.

While FIG. 3 shows an abstracted view of Ethernet SSD 125, FIG. 4 shows another view of storage device 125 of FIG. 1. In FIG. 4, Ethernet SSD 125 may include host interface logic (HIL) 405 (which may also be termed "host interface"), SSD controller 410, and various flash memory chips 325-1 through 325-8 (also termed "flash memory storage"), which may be organized into various channels 415-1 through 415-4. Host interface logic 405 may manage communications between Ethernet SSD 125 and other components (such as processor 110 of FIG. 1). Host interface logic 405 may also manage communications with devices remote from Ethernet SSD 125: that is, devices that are not considered part of machine 105 of FIG. 1, but in communication with Ethernet SSD 125: for example, over one or more network connections. These communications may include read requests to read data from Ethernet SSD 125, write requests to write data to Ethernet SSD 125, and delete requests to delete data from Ethernet SSD 125. Host interface logic 405 may manage an interface across only a single port, or it may manage interfaces across multiple ports. Alternatively, Ethernet SSD 125 may include multiple ports, each of which may have a separate host interface logic 405 to manage interfaces across that port. Embodiments may also mix the possibilities (for example, an SSD with three ports might have one host interface logic to manage one port and a second host interface logic to manage the other two ports). As Ethernet component 305 may be used for communication between Ethernet SSD 125 and host 105 of FIG. 1 (particularly if host 105 of FIG. 1 is a remote host, with communication traversing network 135 of FIG. 1), HIL 405 may include Ethernet component 305.

SSD controller 410 may manage the read and write operations, along with garbage collection and other operations, on flash memory chips 325-1 through 325-8 using a flash memory controller (not shown in FIG. 4). SSD controller 410 may include flash translation layer 420, DPU 310, SPU 315, and accelerator 320. DPU 310, SPU 315, and accelerator 320 are discussed above with reference to FIG. 3; flash translation layer 420 may manage the mapping of LBAs (as used by host 105 of FIG. 1) to PBAs where the data is actually stored on Ethernet SSD 125. By using flash translation layer 420, host 105 of FIG. 1 does not need to be informed when data is moved from one block to another within Ethernet SSD 125.

SSD controller 410 may also include Data Path (DP) coordinator 425, which may manage the flow of data among the compute engines of Ethernet SSD 125. DP coordinator 425 may use a control path to direct data to different compute engines in a sequence that may be determined based on the request sent to Ethernet SSD 125. DP coordinator 425 is discussed further with reference to FIGS. 5-7 below.

While FIG. 4 shows SSD controller 410 as including flash translation layer 420, DPU 310, SPU 315, accelerator 320, and DP coordinator 425, embodiments may locate these modules in any desired locations. Embodiments may also locate these modules within different portions of Ethernet SSD 125: for example, none of these modules might be within SSD controller 410.

While FIG. 4 shows Ethernet SSD 125 as including eight flash memory chips 325-1 through 325-8 organized into four channels 415-1 through 415-4, embodiments may support any number of flash memory chips organized into any number of channels. Similarly, while FIG. 4 shows the structure of a SSD, other storage devices (for example, hard disk drives) may be implemented using a different structure, but with similar potential benefits.

Figure 5:
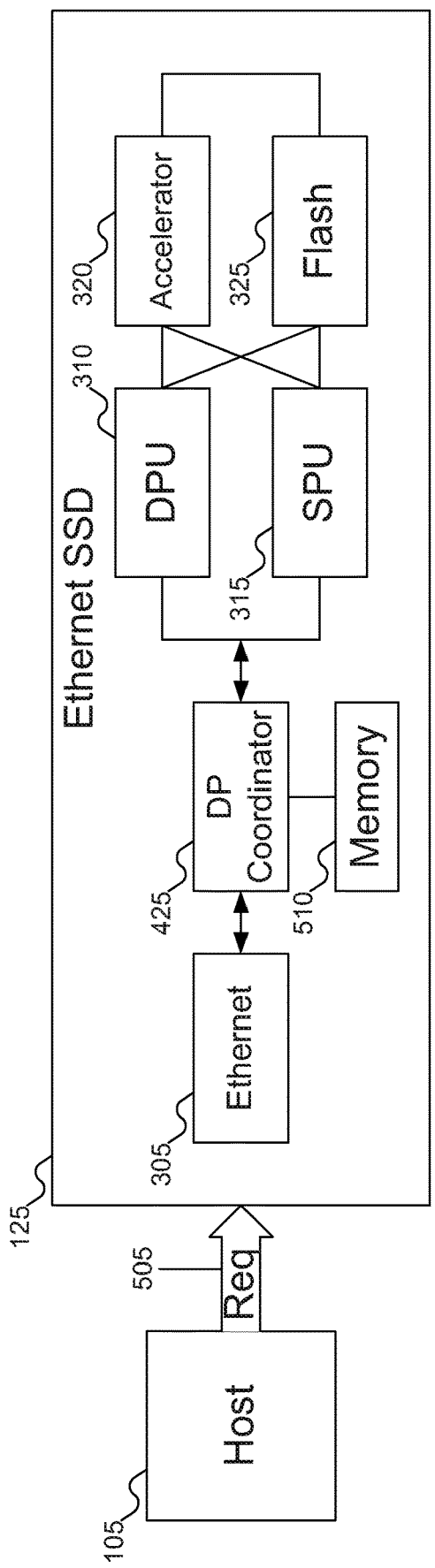
FIG. 5 shows the storage device of FIG. 1 processing a request from the host of FIG. 1.

FIG. 5 shows storage device 125 of FIG. 1 processing a request from host 105 of FIG. 1. In FIG. 5, host 105 may provide request 505 to Ethernet SSD 125. Ethernet SSD 125, using Ethernet component 305, may receive request 505. Request 505 may then be passed to DP coordinator 425. DP coordinator may use request 505 to determine a control path to be used to manage data flow among DPU 310, SPU 315, accelerator 320, and flash 320. A control path, as discussed below with reference to FIG. 7, may include pairings of a compute engine and the command to be sent to that compute engine. DP coordinator 425 may then use the control path to send a command to one of the compute engines, receive a result from the compute engine, and repeat the process until all pairings in the control path have been completed. At that point, DP coordinator 425 may send a result back to host 105, reporting the result of request 505.

As an example of how DP coordinator may operate, consider a query to determine the number of entries in a database that satisfy specific criteria. Ethernet component may receive request 505, from which DP coordinator 425 may determine a control path. DP coordinator 425 may then send a first command to SPU 310 to retrieve the database. DP coordinator 425 may then send a second command to accelerator 320 to perform the query. (If accelerator 320 may access data from flash chips 325-1 through 325-8 directly, then the first command to SPU 310 may be omitted.) Finally, DP coordinator 425 may return a result to host 105.

As a second example, consider a request to update data at an offset of an LBA (with similar operations possible for updating data at an offset from a key in a key-value storage device). While hard disk drives support overwriting data on the disks, flash memory typically does not permit data to be overwritten. Instead, when data is to be changed, the original data block is read, the data is modified in some temporary storage (such as internal memory), and the entire data block is written back to a new block in flash memory (with the original data block invalidated for later garbage collection). Thus, upon receiving a request to update data at an offset of an LBA, DP coordinator 425 may send a command to SPU 315 to read the data block at the LBA. DP coordinator 425 may then send a second command to DPU 310 to perform the update to the data. Finally, DP coordinator 425 may send a third command to SPU 315 to write the updated data back to flash memory (and to invalidate the original data block), after which DP coordinator 425 may return a result to host 105.

Figure 6:
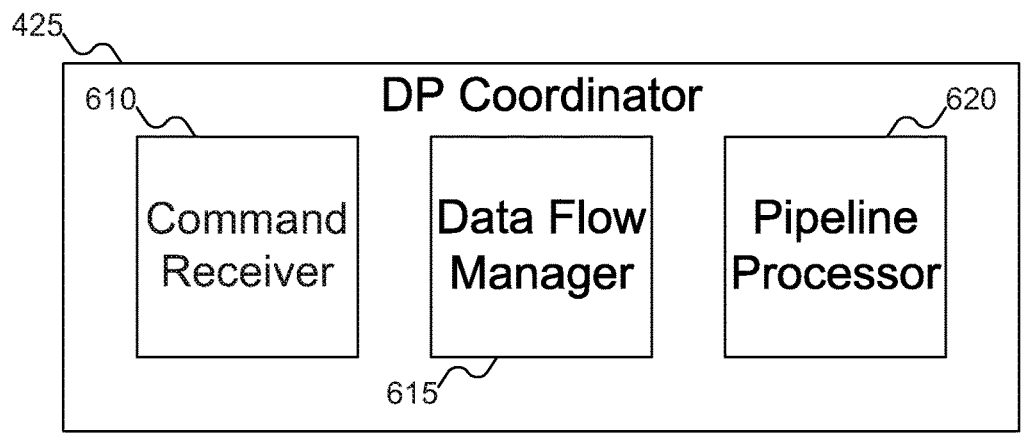
FIG. 6 shows details of the Data Path (DP) coordinator of FIG. 4.

FIG. 6 shows details of DP coordinator 425 of FIG. 4. In FIG. 6, DP coordinator 605 is shown as including command receiver 610, data flow manager 615, and pipeline processor 620. Command receiver 610 may receive a request, such as request 505 of FIG. 5, from host 105 of FIG. 1, and pass that request to data flow manager 615.

Data flow manager 615 may take the request received by command receiver 610 and determine a control path for that request. The control path may be determined, for example, using metadata in the request. For example, metadata included in the request may specify whether the request is host-defined (which may also be termed user-defined) or not, which data flow manager may use to locate and/or determine the appropriate control path. If the request is predefined within storage device 125 of FIG. 1, then data flow manager 615 may check to see if the appropriate control path is already loaded into a memory of DP coordinator 425: if not, then data flow manager 615 may load the appropriate control path from somewhere within storage device 125 of FIG. 1. The control path may be stored, for example, in a reserved area of flash 320 of FIG. 3 or in a dedicated storage within storage device 125 of FIG. 1 (not available for storing user data from host 105 of FIG. 1).

If the control path is host-defined there are several ways in which host 105 of FIG. 1 may provide the control path to data flow manager 615. In some embodiments, host 105 of FIG. 1 may send the control path as part of request 505 of FIG. 5. In other embodiments, host 105 of FIG. 1 may send the control path as part of a separate message, which may be part of a vendor-defined command offered by storage device 125 of FIG. 1. In yet other embodiments, host 105 of FIG. 1 may send a write request to storage device 125 of FIG. 1 to store the control path; when host 105 of FIG. 1 sends the request to storage device 125 of FIG. 1, the request may inform storage device 125 of FIG. 1 where the control path is stored (e.g., the LBA or the key associated with the control path), so that storage device 125 of FIG. 1 may retrieve the control path from the underlying storage medium. In yet other embodiments, host 105 of FIG. 1 may simply include the control path as part of the request. Other ways for host 105 of FIG. 1 to provide the control path to storage device 125 of FIG. 1 may also be covered by embodiments.

Figure 7:
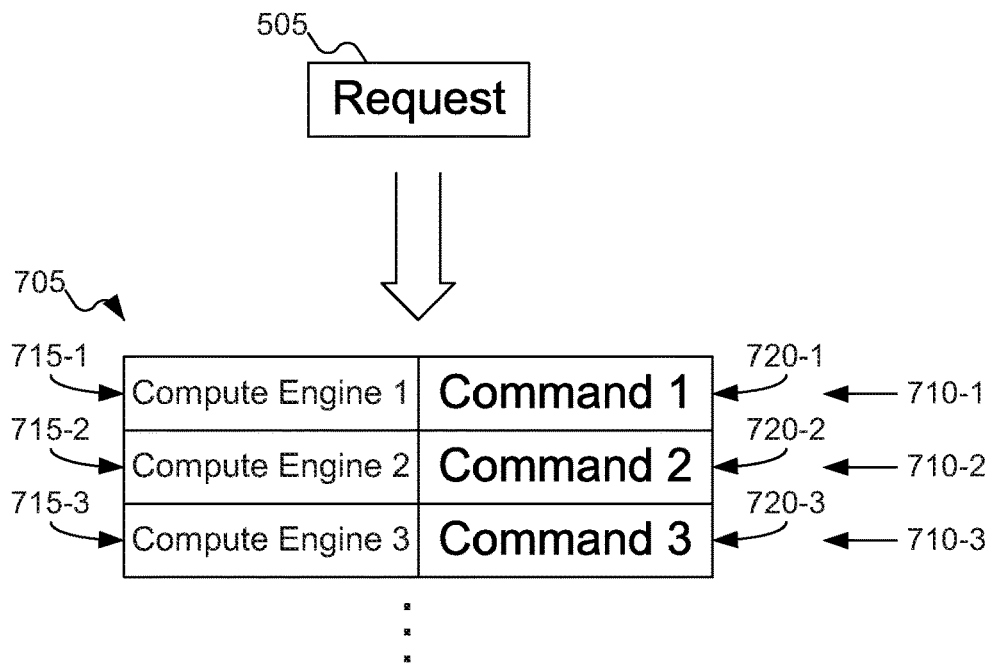
FIG. 7 shows a request from the host of FIG. 1 resulting in a generated control path for data flow among the compute engines of FIG. 3.

A control path may include one or more pairings of a compute engine with a command to be performed using that compute engine. For example, in FIG. 7 control path 705 is shown as including pairings 710-1, 710-2, and 710-3. Pairing 710-1 pairs compute engine 715-1 with command shell 720-1, pairing 710-2 pairs compute engine 715-2 with command shell 720-2, and pairing 710-3 pairs compute engine 715-3 with command shell 715-3. While FIG. 7 shows control path 705 as including three pairings 710-1, 710-2, and 710-3, control path 705 may include any number of pairings, ranging from zero pairings (for a null command) to any desired number. The command in any particular pairing may include parameters (of which there may be zero or more) to be identified from the request (and which may be filled with either data or metadata from the request). For example, if the request was to perform a read-modify-write request, the control path may look as follows, with information shown in curly brackets being parameters to be filled from data or metadata from the request itself:

| | |
|---|---|
| Flash | Read {LBA} |
| SPU | Write {offset}, {LBA} |
| Flash | Write {LBA} |

Returning to FIG. 6, pipeline processor 620 may take the control path and use that control path to manage what compute engine of storage device 125 of FIG. 1 processes what data, and in what order those processes are performed. Thus, pipeline processor 620 may consider pairings 710-1, 710-2, and 710-3 of FIG. 7 in order from control path 705 of FIG. 7. For each such pairing, pipeline processor 620 may identify compute engines 715-1, 715-2, and 715-3 of FIG. 7 and command shells 720-1, 720-2, and 720-3 of FIG. 7 to be sent to compute engines 715-1, 715-2, and 715-3 of FIG. 7. Pipeline processor 620 may then modify command shells 720-1, 720-2, and 720-3 of FIG. 7 as appropriate using parameters provided by host 105 of FIG. 1 in request 505 of FIG. 5, then send those modified command shells 720-1, 720-2, and 720-3 of FIG. 7 to compute engines 715-1, 715-2, and 715-3 of FIG. 7. Once pipeline processor 620 receives a result from the compute engine for a particular pairing, pipeline processor 620 may remove that pairing from control path 705 of FIG. 7 and proceed with the next pairing. Once all pairings in control path 705 of FIG. 7 have been processed, pipeline processor 620 of FIG. 6 may return a result to host 105 of FIG. 1.

A few additional points are worth noting. First, pipeline processor 620 is so named because it may handle pairings 710-1, 710-2, and 710-3 of FIG. 7 in order, as though coming through a pipe (that is, first in, first out) (although embodiments may support pipeline processor 620 handling pairings out of sequence). But pipeline processor 620 may process multiple requests concurrently (with "concurrently" intended to mean that at least part, although not necessarily all, of the control paths are being processed by pipeline processor 620 at the same time). For example, if one control path uses accelerator 320 of FIG. 3 while a second control path uses SPU 315 of FIG. 1, these two compute engines may be used by the two control paths concurrently (the two control paths are not competing to use the same compute engine at the same time). This concept generalizes to any desired extent: as long as control paths are not expecting to use the same compute engine at the same time, any number of control paths may be managed by pipeline processor 620 at the same time. Further, these concurrently executed control paths may be the result of different requests sent to storage device 125, which may be from different hosts. In other words, pipeline processor 620 may be managing control paths to handle requests from multiple hosts concurrently.

One might think that the upper bound on the number of control paths being executed concurrently is equal to the number of compute engines in storage device 125 of FIG. 1. But in fact, more control paths may be executed concurrently than the number of compute engines in storage device 125 of FIG. 1. For example, a storage device may include exactly one DPU, one SPU, one accelerator, and one flash chip (whether such a storage device is realistic is not relevant to the analysis, and as discussed above embodiments may include any number of each of such modules, without any theoretical limit), for a total of four compute engines. If there are four control paths that each currently want access to the flash chip and a fifth control path that wants access to the SPU, all five control paths may be executed concurrently. (It is true that three of the four control paths wanting access to the flash chip may be suspended while the fourth control path accesses the flash chip, but that fact does not preclude pipeline processor 620 having all five control paths in various stages of execution at the same time.) Pipeline processor 620 may use any desired approach to handling the concurrent control paths, such as those techniques used by processors to manage concurrent or parallel data processing.

Second, it may occur that, for some pairing in the control path, a particular command as executed by a compute engine may not operate correctly. For example, a cell in flash memory might become damaged so that it cannot be written to and/or read from successfully, or a circuit may become damaged so that a particular function may not be computed correctly. In such situations, the compute engine in question may return a result indicating an error. In that case, pipeline processor 620 may abort the rest of the execution of the control path and immediately return an error to host 105 of FIG. 1 (after all, if one step in the process does not complete properly, then any subsequent computations may be meaningless).

Third, DP coordinator 425 may include some local storage (such as RAM or an equivalent memory) for control paths that are being used to satisfy requests from host 105 of FIG. 1. This storage may be thought of as similar to a cache. Control paths may be loaded into storage and rotated out of storage as appropriate using any desired policy, with cache policies, such as Least Recently Used (LRU) or Least Frequently Used (LFU), being examples thereof.

Alternatively (or in addition), host 105 of FIG. 1 may send commands to storage device 125 of FIG. 1 to load and/or unload particular control paths into this storage. For example, consider the situation where host 105 of FIG. 1 desires a host-defined control path to be used. Since this control path is host-defined, it might only be used by host 105 of FIG. 1 in certain specific situations. Host 105 of FIG. 1 may send a request that the host-defined control path be loaded into storage, so that data flow manager 615 may easily access the host-defined control path. Then, when host 105 of FIG. 1 knows that there will be no further requests (at least within the relative near term) that will use the host-defined control path, host 105 of FIG. 1 may send a request that the host-defined control path be unloaded from storage, freeing up space for other control paths to be loaded.

Earlier it was described how host 105 of FIG. 1 may provide a host-defined control path to storage device 125 of FIG. 1. Here, how host 105 of FIG. 1 may define a control path may be revisited. Given knowledge of the commands that may be executed by storage device 125 of FIG. 1, host 105 of FIG. 1 may define a control path by specifying a sequence of commands to be executed, along with information indicating what data is to be processed by that command. Since a control path may include pairings of commands and compute engines to execute those commands, host 105 of FIG. 1 may specify which compute engine is to perform each command in the host-defined control path.

Note that host 105 of FIG. 1 may define a control path without knowledge of the internal hardware architecture of the compute engines in storage device 125 of FIG. 1.

In fact, it may also be possible for host 105 of FIG. 1 to define a host-defined control path without knowing what compute engine executes particular commands. So long as there is no command that might be executed by multiple different compute engines within storage device 125 of FIG. 1, data flow manager 615 may be able to "fill in" the compute engine to be associated with the commands to be executed in a control path. In such embodiments, host 105 of FIG. 1 may be able to define a control path even without knowledge of the compute engines present within storage device 125 of FIG. 1: that is, without any information about the internal hardware architecture of storage device 125 of FIG. 1.

Figure 8:
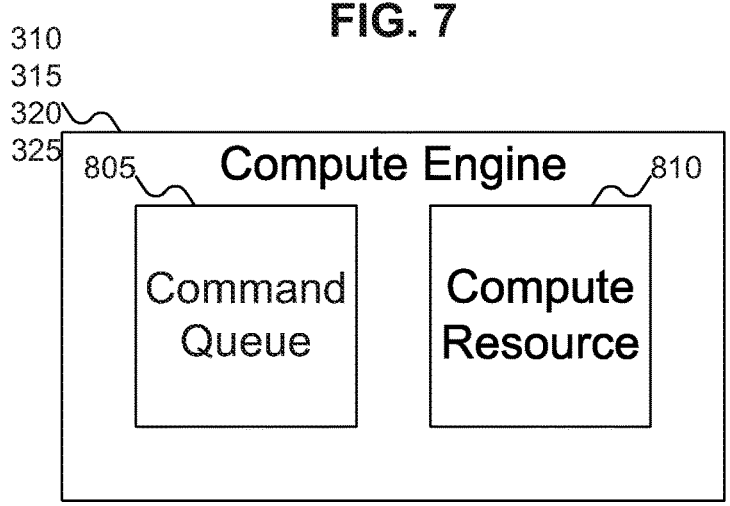
FIG. 8 shows an abstracted view of the compute engines of FIG. 3.

FIG. 8 shows an abstracted view of the compute engines of FIG. 3. For any individual compute engine, such as compute engines 310, 315, 320, and/or 325 of FIG. 3, the compute engine may include command queue 805 and compute resource 810. Command queue 805 may handle commands received from DP coordinator 425 of FIG. 4 and may be used to send a result back to DP coordinator 425 of FIG. 4. Compute resource 810 may be the actual resource of the compute engine (such as the heart of the DPU, SPU, accelerator, or flash).

By using command queue 805, compute engines may present a common interface to DP coordinator 425 of FIG. 4. This approach modularizes the compute engines, so that they may offer the same interface to DP coordinator 425 of FIG. 4, regardless of their specific implementation.

Command queue 805 may buffer multiple commands. As compute resource 810 becomes available, one or more commands may be removed from command queue 805 and processed using compute resource 810.

Figure 9A:
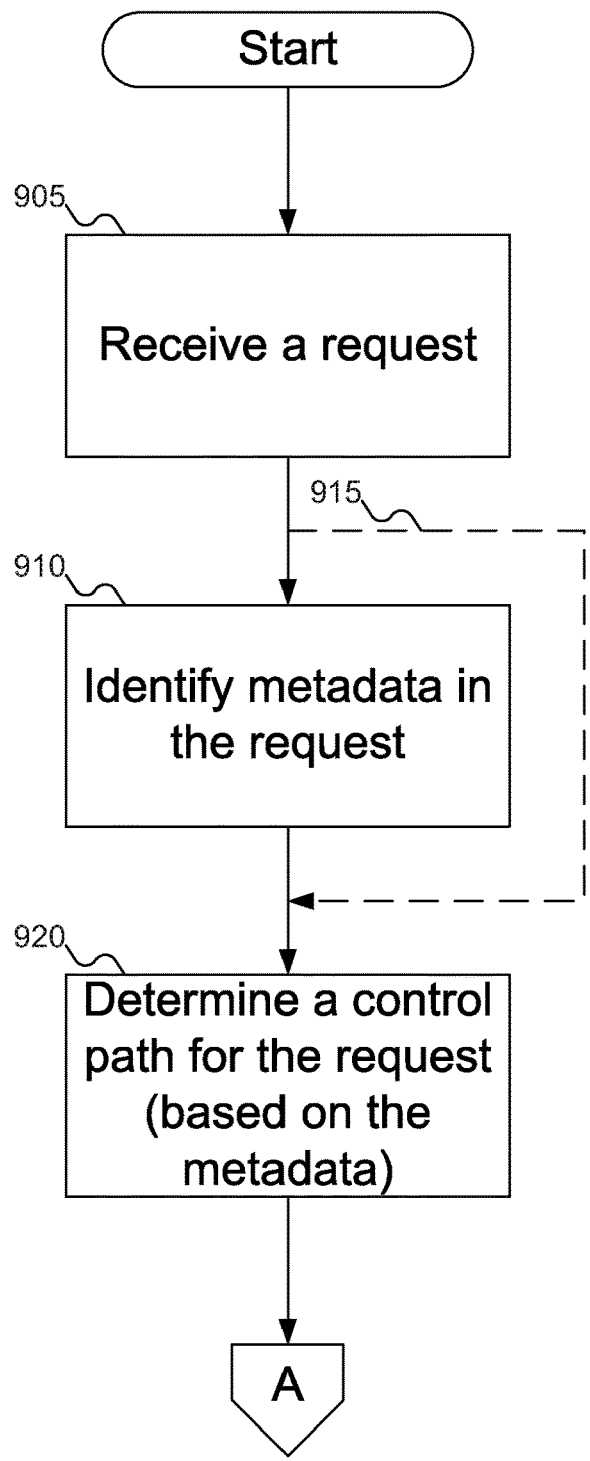
FIGS. 9A-9B show a flowchart of an example procedure for the storage device of FIG. 1 to use a control path for data flow between the compute engines of FIG. 3, according to embodiments.
Figure 9B:
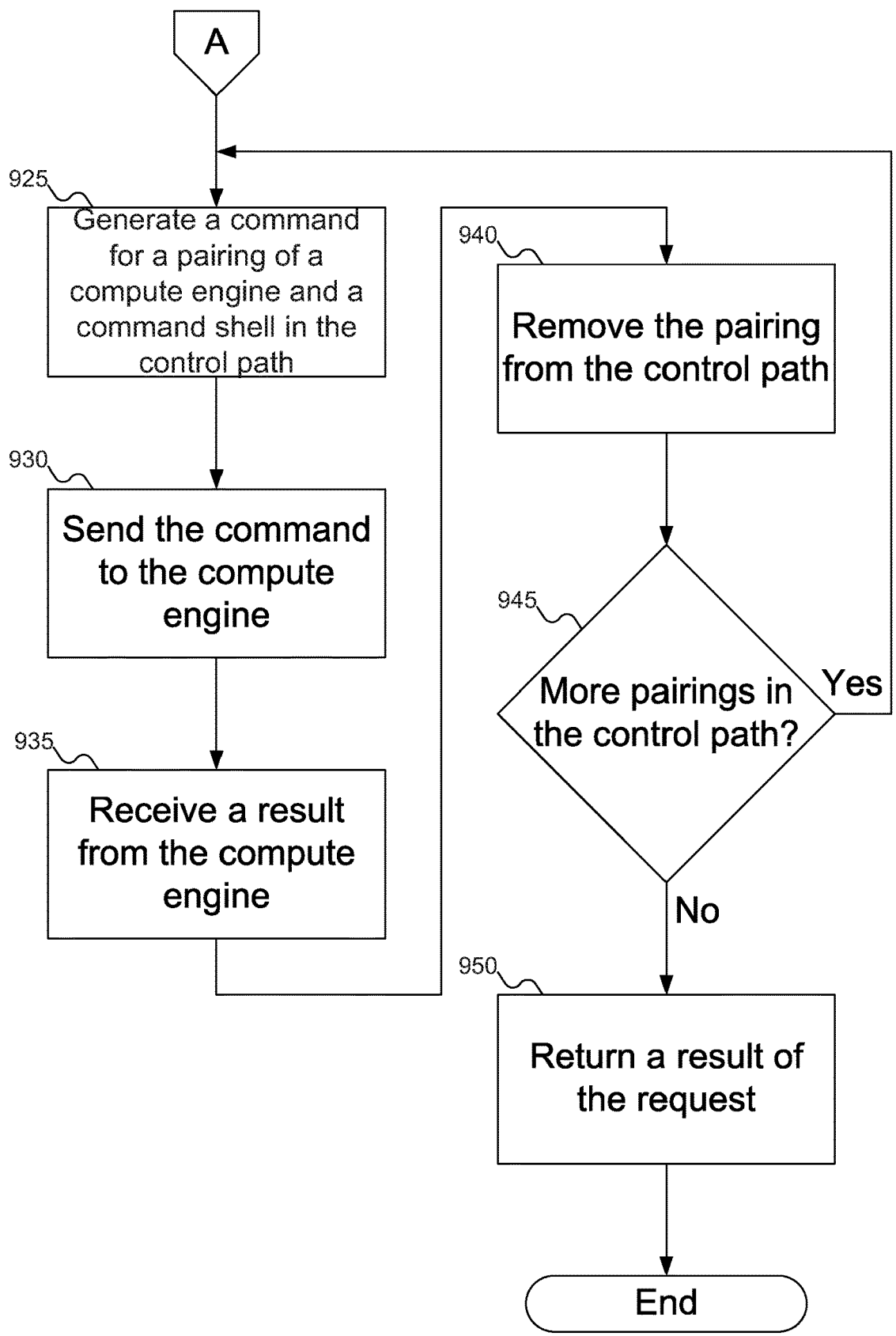

FIGS. 9A-9B show a flowchart of an example procedure for storage device 125 of FIG. 1 to use a control path for data flow between the compute engines of FIG. 3, according to embodiments. In FIG. 9A, at block 905, command receiver 610 of FIG. 6 may receive request 505 of FIG. 5 from host 105 of FIG. 1. At block 910, data flow manager 615 of FIG. 6 may identify metadata in request 505 of FIG. 5. Block 910 is optional and may be omitted, as shown by dashed line 915. At block 920, data flow manager 615 of FIG. 6 may determine control path 705 of FIG. 7 for request 505 of FIG. 5: data flow manager 615 of FIG. 6 may determine control path 705 of FIG. 7 based on metadata 505 of FIG. 5 or based on the request itself.

At block 925 (FIG. 9B), pipeline processor 620 of FIG. 6 may generate a command for a given pairing of control path 705 of FIG. 7. At block 930, pipeline processor 620 of FIG. 6 may send the command to a compute engine. At block 935, pipeline processor 620 of FIG. 6 may receive a result from the compute engine. At block 940, pipeline processor 620 of FIG. 6 may remove the pairing from control path 705 of FIG. 7. At block 945, pipeline processor 620 of FIG. 6 may determine if there are any remaining pairings in control path 705 of FIG. 7. If yes, then processing may return to block 925 to process the next pairing in control path 705 of FIG. 7. Otherwise, at block 950, DP coordinator 425 of FIG. 4 may return a result back to host 105 of FIG. 1.

Figure 10:
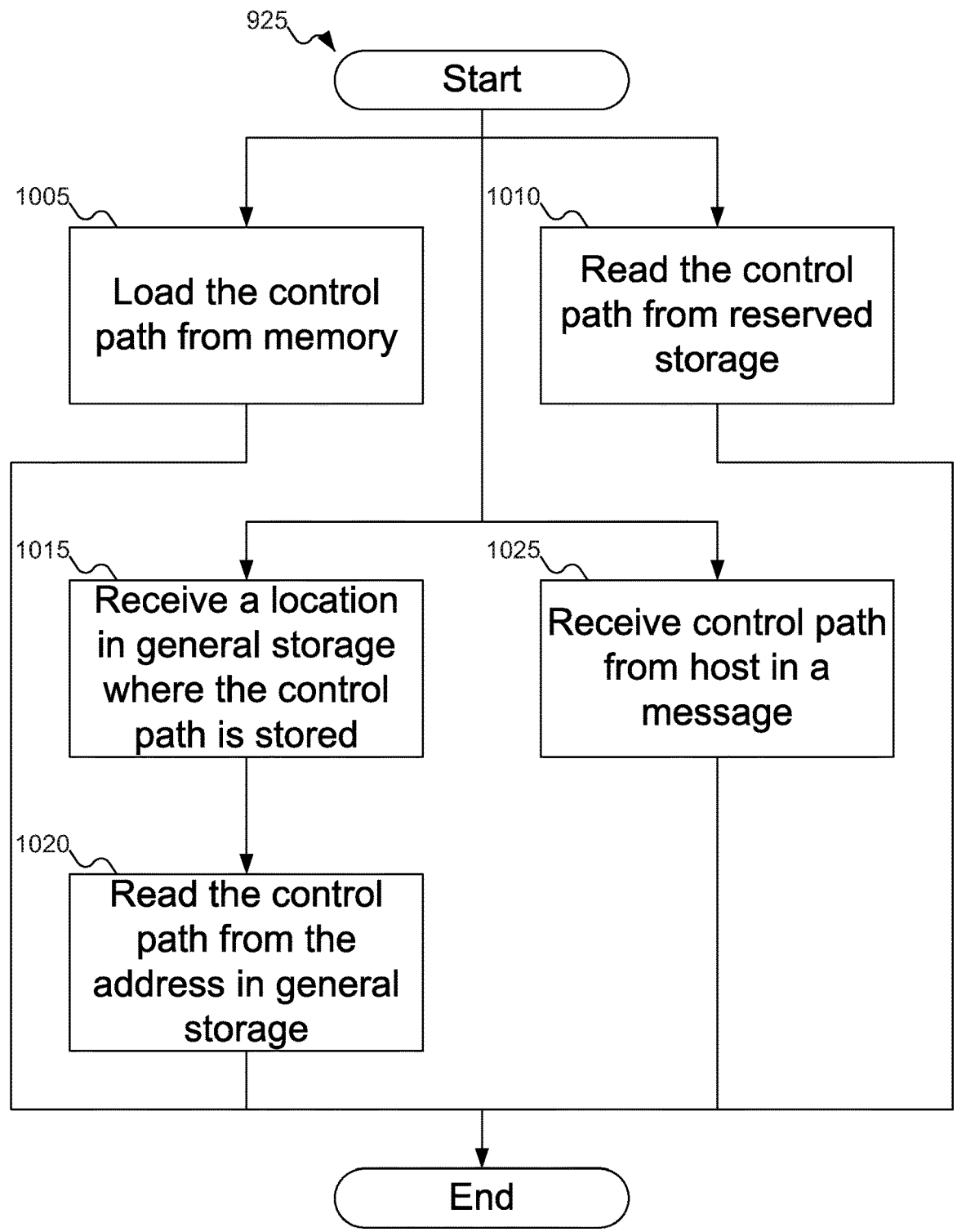
FIG. 10 shows a flowchart of an example procedure for the storage device of FIG. 1 to generate a control path for a request from the host of FIG. 1, according to embodiments.

FIG. 10 shows a flowchart of an example procedure for storage device 125 of FIG. 1 to determine a control path for a request from host 105 of FIG. 1, according to embodiments. In FIG. 10, at block 1005, data flow manager 615 of FIG. 6 may load control path 705 of FIG. 7 (for a request) that is already in memory from the memory. Alternatively, at block 1010, data flow manager 615 of FIG. 6 may read control path 705 of FIG. 7 from reserved storage in storage device 125 of FIG. 1. Alternatively, at block 1015, data flow manager 615 of FIG. 6 may receive a location (such as an LBA or a key) where host 105 of FIG. 1 previously stored control path 705 of FIG. 7 on storage device 125 of FIG. 1, and at block 1020 data flow manager 615 of FIG. 6 may read control path 705 of FIG. 7 from the location specified by host 105 of FIG. 1. Alternatively, at block 1025, data flow manager 615 of FIG. 6 may receive control path 705 of FIG. 7 from host 105 of FIG. 1, either as part of request 505 of FIG. 5 or in another message.

Figure 11:
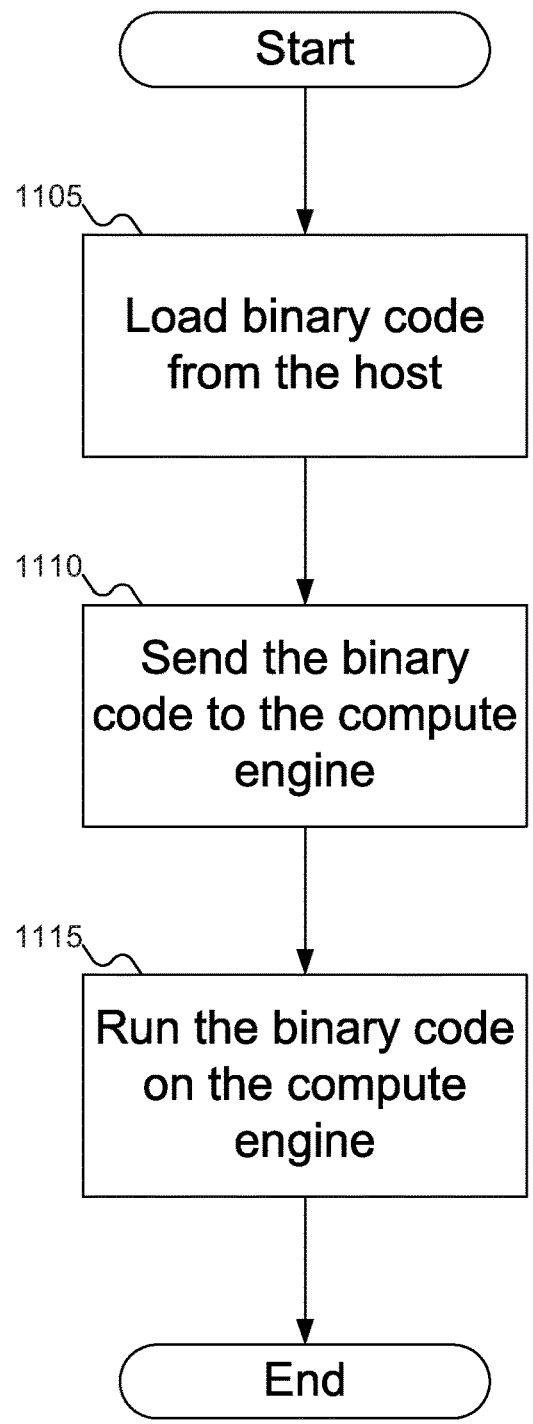
FIG. 11 shows a flowchart of an example procedure for the storage device of FIG. 1 to load binary code to be executed by a compute engine of FIG. 3, according to embodiments.

If control path 705 of FIG. 7 involves executing binary code in a compute engine, pipeline processor 620 of FIG. 6 may need to load the binary code and send it to the compute engine. FIG. 11 shows a flowchart of an example procedure for the storage device of FIG. 1 to load binary code to be executed by a compute engine of FIG. 3, according to embodiments. In FIG. 11, at block 1105, pipeline processor 620 of FIG. 6 may load the binary code from host 105 of FIG. 1. As discussed above, DP coordinator 425 of FIG. 4 may receive the binary code from host 105 of FIG. 1 in a message, or DP coordinator 425 of FIG. 4 may receive a location (such as an LBA or a key) where the binary code is stored on storage device 125 of FIG. 1 and load the binary code from that location. At block 1110, pipeline processor 620 of FIG. 6 may send the binary code to the appropriate compute engine. Finally, at block 1115, the compute engine may run the binary code.

In FIGS. 9A-11, some embodiments are shown. But a person skilled in the art will recognize that other embodiments are also possible, by changing the order of the blocks, by omitting blocks, or by including links not shown in the drawings, irrespective of any elements that may specifically be omitted. All such variations of the flowcharts are considered to be embodiments, whether expressly described or not.

Embodiments include technical advantages over conventional implementations. By defining control paths to process various requests, a storage device may be more fully utilized, without the host machine (or a user) needing knowledge of the internal hardware architecture of the storage device. Further, it may be possible to avoid using binary code or to limit binary code to data processing units, thereby reducing or eliminating potential security risks associated with binary code. Finally, the host machine may be able to define its own control paths for custom requests, again without the host machine needing knowledge of the internal hardware architecture of the storage device, without creating potential security risks, and without the host having to control the data flow internal to the storage device.

The following discussion is intended to provide a brief, general description of a suitable machine or machines in which certain aspects can be implemented. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Embodiments can include a tangible, non-transitory machine-readable medium comprising instructions executable by one or more processors, the instructions comprising instructions to perform the elements as described herein.

Having described and illustrated the principles with reference to illustrated embodiments, it will be recognized that the illustrated embodiments can be modified in arrangement and detail without departing from such principles, and can be combined in any desired manner. And, although the foregoing discussion has focused on particular embodiments, other configurations are contemplated. In particular, even though expressions such as "according to an embodiment" or the like are used herein, these phrases are meant to generally reference embodiment possibilities, and are not intended to limit embodiments to particular embodiment configurations. As used herein, these terms can reference the same or different embodiments that are combinable into other embodiments.

The foregoing illustrative embodiments are not to be construed as limiting embodiments thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of embodiments as defined in the claims.

Embodiments may extend to the following statements, without limitation:

Statement 1. An embodiment includes a storage device, comprising:
  compute engines, the compute engines including:
    storage for data;
    a Storage Processing Unit (SPU) to manage writing data to and reading data from the storage for data;
    a Data Processing Unit (DPU) to perform first functions on the data; and
    an accelerator to perform second functions on the data;
  an Ethernet component to receive a request at the storage device from a host over a network; and
  a Data Processing (DP) coordinator to process the request using a first of the compute engines.

Statement 2. An embodiment includes the storage device according to statement 1, wherein the storage device includes a Solid State Drive (SSD).

Statement 3. An embodiment includes the storage device according to one of statements 1-2, wherein the DP coordinator includes one of a hardware DP coordinator, software running on the SPU, or the software running on a second SPU.

Statement 4. An embodiment includes the storage device according to one of statements 1-3, wherein the DP coordinator includes:
  a command receiver to receive the request from the Ethernet component;
  a data flow manager to determine a control path based at least in part on the request, the control path including a pairing of the first of the compute engines and a command shell; and
  a pipeline processor to send a command to the first of the compute engines based on the command shell.

Statement 5. An embodiment includes the storage device according to one of statements 1-4, wherein the DP coordinator receives a result of the command from the first of the compute engines.

Statement 6. An embodiment includes the storage device according to one of statements 1-5, wherein the DP coordinator sends a second result of the request to the host over the network.

Statement 7. An embodiment includes the storage device according to one of statements 1-6, wherein:
  the control path includes a second pairing of a second of the compute engines and a second command shell; and
  the pipeline processor sends a second command to the second of the compute engines based on the second command shell.

Statement 8. An embodiment includes the storage device according to one of statements 1-7, wherein the pipeline processor sends the second command to the second of the compute engines based on the second command shell after the DP coordinator receives a result of the command from the first of the compute engines.

Statement 9. An embodiment includes the storage device according to one of statements 1-4, wherein the first of the compute engines executes the command concurrently with a second of the compute engines executing a second command.

Statement 10. An embodiment includes the storage device according to one of statements 1-4 or 9, wherein the second command is based at least in part on a second request.

Statement 11. An embodiment includes the storage device according to one of statements 1-4 or 9, further comprising a memory for the control path.

Statement 12. An embodiment includes the storage device according to one of statements 1-4, 9, or 11, further comprising a second storage for the control path.

Statement 13. An embodiment includes the storage device according to one of statements 1-4, 9, or 11-12, wherein the DP coordinator receives the control path from the host over the network.

Statement 14. An embodiment includes the storage device according to one of statements 1-4, 9, or 11-13, wherein:
the request includes a metadata; and
the DP coordinator determines the control path for the request based at least in part on the metadata in the request.

Statement 15. An embodiment includes the storage device according to one of statements 1-4, 9, or 11-14, wherein:
the DP coordinator receives binary code from the host over the network; and
the DPU runs the binary code.

Statement 16. An embodiment includes the storage device according to one of statements 1-4, 9, or 11-15, wherein the DPU runs the binary code based at least in part on a command in a control path.

Statement 17. An embodiment includes a method, comprising:
receiving a request at a storage device from a host;
determining a control path for the request, the control path for the request including a pairing of a compute engine within the storage device and a command shell;
generating a command based at least in part on the pairing of the compute engine and the command shell; and
sending the command to the compute engine.

Statement 18. An embodiment includes the method according to statement 17, wherein the storage device includes a Solid State Drive (SSD).

Statement 19. An embodiment includes the method according to one of statements 17-18, wherein the compute engine is one of at least four compute engines including:
storage for data;
a Storage Processing Unit (SPU) to manage writing data to and reading data from the storage for data;
a Data Processing Unit (DPU) to perform first functions on the data; and
an accelerator to perform second functions on the data.

Statement 20. An embodiment includes the method according to one of statements 17-19, further comprising:
receiving a result of the command from the compute engine.

Statement 21. An embodiment includes the method according to one of statements 17-20, further comprising returning a second result of the request to the host.

Statement 22. An embodiment includes the method according to one of statements 17-20, wherein:
the control path for the request further includes a second pairing of a second compute engine within the storage device and a second command shell; and
the method further comprises:
generating a second command based at least in part on the second pairing of the second compute engine and the second command shell; and
sending the second command to the second compute engine.

Statement 23. An embodiment includes the method according to one of statements 17-20 or 22, wherein sending the second command to the second compute engine includes sending the second command to the second compute engine after receiving a result of the command from the compute engine.

Statement 24. An embodiment includes the method according to one of statements 17-20 or 22, further comprising removing the pairing of the compute engine and the command shell from the control path.

Statement 25. An embodiment includes the method according to one of statements 17-20, 22, or 24, wherein determining the control path for the request includes loading the control path from a memory in the storage device.

Statement 26. An embodiment includes the method according to one of statements 17-20, 22, or 24-25, wherein determining the control path for the request includes reading the control path from storage in the storage device.

Statement 27. An embodiment includes the method according to one of statements 17-20, 22, or 24-26, wherein determining the control path for the request includes receiving the control path from the host.

Statement 28. An embodiment includes the method according to one of statements 17-20, 22, or 24-27, wherein receiving the control path from the host includes:
receiving a location where the control path is stored; and
reading the control path from the location in a storage.

Statement 29. An embodiment includes the method according to one of statements 17-20, 22, or 24-27, wherein:
the request includes a metadata; and
determining the control path for the request includes determining the control path for the request based at least in part on the metadata in the request.

Statement 30. An embodiment includes the method according to one of statements 17-20, 22, 24-27, or 29, wherein sending the command to the compute engine includes:
loading binary code for the compute engine from the host; and
running the binary code on the compute engine.

Statement 31. An embodiment includes the method according to one of statements 17-20, 22, 24-27, or 29-30, wherein receiving the request at the storage device from the host includes receiving the request at the storage device from the host over an Ethernet connection on the storage device.

Statement 32. An embodiment includes the method according to one of statements 17-20, 22, 24-27, or 29-31, wherein the compute engine processes the command concurrently with a second compute engine processing a second command.

Statement 33. An embodiment includes the method according to one of statements 17-20, 22, 24-27, or 29-32, wherein the second command is generated using a second control path based at least in part on a second request.

Statement 34. An embodiment includes an article, comprising a non-transitory storage medium, the non-transitory storage medium having stored thereon instructions that, when executed by a machine, result in:
receiving a request at a storage device from a host;
determining a control path for the request, the control path for the request including a pairing of a compute engine within the storage device and a command shell;
generating a command based at least in part on the pairing of the compute engine and the command shell; and
sending the command to the compute engine.

Statement 35. An embodiment includes the article according to statement 34, wherein the storage device includes a Solid State Drive (SSD).

Statement 36. An embodiment includes the article according to one of statements 34-35, wherein the compute engine is one of at least four compute engines including:
storage for data;
a Storage Processing Unit (SPU) to manage writing data to and reading data from the storage for data;
a Data Processing Unit (DPU) to perform first functions on the data; and
an accelerator to perform second functions on the data.

Statement 37. An embodiment includes the article according to one of statements 34-36, the non-transitory storage medium having stored thereon further instructions that, when executed by the machine, result in:

receiving a result of the command from the compute engine.

Statement 38. An embodiment includes the article according to one of statements 34-37, the non-transitory storage medium having stored thereon further instructions that, when executed by the machine, result in returning a second result of the request to the host.

Statement 39. An embodiment includes the article according to one of statements 34-37, wherein:

the control path for the request further includes a second pairing of a second compute engine within the storage device and a second command shell; and the non-transitory storage medium having stored thereon further instructions that, when executed by the machine, result in:

generating a second command based at least in part on the second pairing of the second compute engine and the second command shell; and sending the second command to the second compute engine.

Statement 40. An embodiment includes the article according to one of statements 34-37 or 39, wherein sending the second command to the second compute engine includes sending the second command to the second compute engine after receiving a result of the command from the compute engine.

Statement 41. An embodiment includes the article according to one of statements 34-37 or 39, the non-transitory storage medium having stored thereon further instructions that, when executed by the machine, result in removing the pairing of the compute engine and the command shell from the control path.

Statement 42. An embodiment includes the article according to one of statements 34-37, 39, or 41, wherein determining the control path for the request includes loading the control path from a memory in the storage device.

Statement 43. An embodiment includes the article according to one of statements 34-37, 39, or 41-42, wherein determining the control path for the request includes reading the control path from storage in the storage device.

Statement 44. An embodiment includes the article according to one of statements 34-37, 39, or 41-43, wherein determining the control path for the request includes receiving the control path from the host.

Statement 45. An embodiment includes the article according to one of statements 34-37, 39, or 41-44, wherein receiving the control path from the host includes:

receiving a location where the control path is stored; and
reading the control path from the location in a storage.

Statement 46. An embodiment includes the article according to one of statements 34-37, 39, or 41-44, wherein:

the request includes a metadata; and
determining the control path for the request includes determining the control path for the request based at least in part on the metadata in the request.

Statement 47. An embodiment includes the article according to one of statements 34-37, 39, 41-44, or 46, wherein sending the command to the compute engine includes:

loading binary code for the compute engine from the host; and
running the binary code on the compute engine.

Statement 48. An embodiment includes the article according to one of statements 34-37, 39, 41-44, or 46-47, wherein receiving the request at the storage device from the host includes receiving the request at the storage device from the host over an Ethernet connection on the storage device.

Statement 49. An embodiment includes the article according to one of statements 34-37, 39, 41-44, or 46-48, wherein the compute engine processes the command concurrently with a second compute engine processing a second command.

Statement 50. An embodiment includes the article according to one of statements 34-37, 39, 41-44, or 46-49, wherein the second command is generated using a second control path based at least in part on a second request.

Consequently, in view of the wide variety of permutations to the embodiments described herein, this detailed description and accompanying material is intended to be illustrative only, and should not be taken as limiting the scope of the embodiments. What is claimed as the embodiments, therefore, is all such modifications as may come within the scope and spirit of the following claims and equivalents thereto.

What is claimed is:

1. A storage device, comprising:
a first compute engine;
a second compute engine;
an Ethernet component to receive a request at the storage device from a host over a network; and
a Data Processing (DP) coordinator to process the request using the first compute engine and the second compute engine, the DP coordinator including:
a command receiver to receive the request from the Ethernet component;
a data flow manager to determine a control path based at least in part on the request, the control path including a first pairing of a first command shell with the first compute engine and a second pairing of a second command shell with the second compute engine; and
a pipeline processor to send a first command based on the first command shell to the first compute engine and to send a second command based on the second command shell to the second compute engine.

2. A storage device according to claim 1, wherein the pipeline processor is configured to send the second command based on the second command shell to the second compute engine based at least in part on the DP coordinator receiving a result of the first command from the first compute engine.

3. A storage device according to claim 1, wherein the first compute engine is configured to execute the first command concurrently with the second compute engine executing the second command.

4. A storage device according to claim 1, wherein:
the request includes a metadata; and
the data flow manager is configured to determine the control path for the request based at least in part on the metadata in the request.

5. A storage device according to claim 1, wherein:
the DP coordinator receives binary code from the host over the network;
the second compute engine includes a Data Processing Unit (DPU); and
the DPU is configured to execute the binary code.

6. A method, comprising:
receiving a request at a storage device from a host;
determining a control path for the request, the control path for the request including a first pairing of a command shell with a first compute engine within the storage device and a second pairing of a second command shell with a second compute engine within the storage device;
generating a first command based at least in part on the first command shell;
sending the first command to the first compute engine;
generating a second command based at least in part on the second command shell; and
sending the second command to the second compute engine.

7. A method according to claim 6, wherein
the first compute engine includes at least one of a first storage for a data, a first Storage Processing Unit (SPU) to manage writing the data or reading the data, a first Data Processing Unit (DPU) to perform a first function on the data, or a first accelerator to perform a second function on the data; and
the second compute engine includes at least one of a second storage for the data, a second SPU to manage writing the data or reading the data, a second DPU to perform a third function on the data, or a second accelerator to perform a fourth function on the data.

8. A method according to claim 6, wherein determining the control path for the request includes receiving the control path from the host.

9. A method according to claim 8, wherein receiving the control path from the host includes:
receiving a location where the control path is stored; and
reading the control path from the location in a storage.

10. A method according to claim 6, wherein:
the request includes a metadata; and
determining the control path for the request includes determining the control path for the request based at least in part on the metadata in the request.

11. A method according to claim 6, wherein sending the command to the first compute engine includes:
loading binary code for the first compute engine from the host; and
executing the binary code on the first compute engine.

12. A method according to claim 6, wherein receiving the request at the storage device from the host includes receiving the request at the storage device from the host over an Ethernet connection on the storage device.

13. A method according to claim 6, wherein the first compute engine processes the command concurrently with the second compute engine processing the second command.

14. An article, comprising a non-transitory storage medium, the non-transitory storage medium having stored thereon instructions that, when executed by a machine, result in:
receiving a request at a storage device from a host;
determining a control path for the request, the control path for the request including a first pairing of a command shell with a first compute engine within the storage device and a second pairing of a second command shell with a second compute engine within the storage device;
generating a first command based at least in part on the first command shell;
sending the first command to the first compute engine;
generating a second command based at least in part on the second command shell; and
sending the second command to the second compute engine.

15. An article according to claim 14, wherein determining the control path for the request includes determining the control path for the request using a data flow manager within the storage device.

16. A storage device according to claim 1, wherein:
the first compute engine includes at least one of a first storage for a data, a first Storage Processing Unit (SPU) to manage writing the data or reading the data, a first DPU to perform a first function on the data, or a first accelerator to perform a second function on the data; and
the second compute engine includes at least one of a second storage for the data, a second SPU to manage writing the data or reading the data, a second DPU to perform a third function on the data, or a second accelerator to perform a fourth function on the data.

17. A storage device according to claim 1, further comprising a third compute engine includes at least one of a third storage for the data, a third SPU to manage writing the data or reading the data, a third DPU to perform a fifth function on the data, or a third accelerator to perform a sixth function on the data.

18. A storage device according to claim 1, wherein the data flow manager is configured to determine a second control path based at least in part on a second request, the second control path different from the control path.

19. A storage device according to claim 18, wherein the second control path includes a third pairing of a third command shell with a third compute engine.

20. A method according to claim 6, wherein determining the control path for the request includes determining the control path for the request using a data flow manager within the storage device.

* * * * *